No. 618,642.  
S. F. CLOUSER.  
DRIVING MECHANISM.  
(Application filed Apr. 14, 1898.)  
Patented Jan. 31, 1899.

(No Model.)

*Witnesses:-*
George Barry Jr
Fred Haynes

*Inventor:*
Samuel F. Clouser
by attorneys
Brown & Seward

UNITED STATES PATENT OFFICE.

SAMUEL F. CLOUSER, OF NEW YORK, N. Y.

DRIVING MECHANISM.

SPECIFICATION forming part of Letters Patent No. 618,642, dated January 31, 1899.

Application filed April 14, 1898. Serial No. 677,526. (No model.)

*To all whom it may concern:*

Be it known that I, SAMUEL F. CLOUSER, a citizen of the United States, and a resident of the borough of Brooklyn, in the city and State of New York, have invented a new and useful Improvement in Driving Mechanisms, of which the following is a specification.

My invention relates to an improvement in driving mechanism, with the objects in view of providing a driving mechanism in which the engagement between the chain and the driving-wheel is such as to cause the chain to run very smoothly and with a small amount of friction and in which the chain will readily leave the driving-wheel even when the wheel is rotated at a high speed.

A practical embodiment of my invention is represented in the accompanying drawings, in which—

Figure 1:
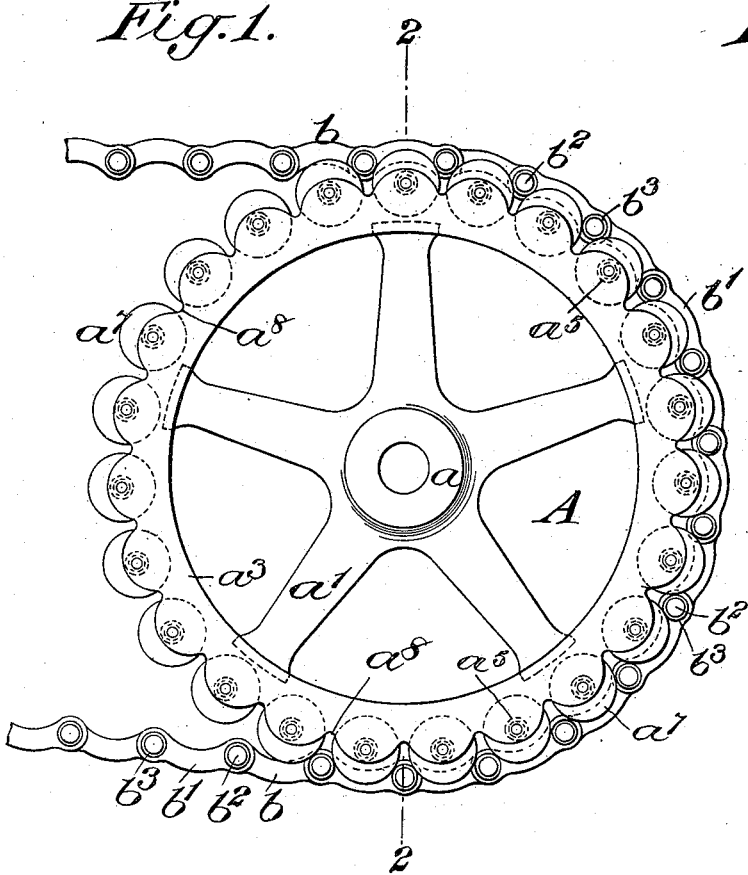
Figure 2:
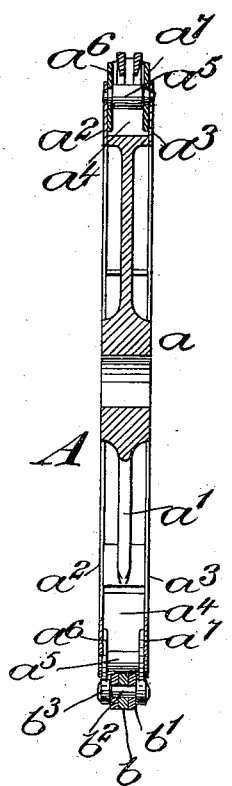
Figure 3:
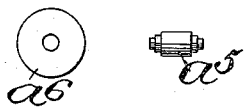

Figure 1 represents a side view of the driving-wheel and a portion of the chain engaged therewith. Fig. 2 is a transverse vertical central section in the plane of the line 2 2 of Fig. 1, and Fig. 3 shows detail views of the driving-wheel rollers and the pivot upon which they are mounted to rotate.

The driving-wheel A comprises a suitable hub $a$, a web $a'$, in the present instance of spider form, and a rim composed of a pair of annular flanges $a^2$ $a^3$, secured to the web $a'$ in any desired manner—as, for instance, by being brazed thereto. These annular flanges $a^2$ $a^3$ are spaced a short distance apart, so as to form an annular groove $a^4$ therebetween. An annular series of pivots $a^5$ are spaced apart around the wheel between the annular flanges $a^2$ $a^3$, the said pivots being preferably riveted to the said flanges at their ends.

Upon each of the pivots $a^5$ I mount a pair of rollers or disks $a^6$ $a^7$, the said rollers having a rotary bearing on said pivot between the notched central portion of the pivot and the annular flanges. These rollers are of considerable size, so as to project a considerable distance beyond the peripheries of the flanges $a^2$ $a^3$, and the said rollers are so mounted that the adjacent parts of the peripheries of two consecutive rollers are quite close to each other.

The chain B is composed of single and double links $b$ $b'$, connected together by rivets $b^2$, which rivets are extended outwardly upon the opposite sides of the chain to form bearing-studs, which studs may be provided with friction-rollers $b^3$, if desired. As the chain engages the driving-wheel the links of the chain will pass between the pairs of rollers $a^6$ $a^7$ and the studs of the chain will rest upon the peripheries of two adjacent rollers. The links of the chain bear such a relation to the rollers of the driving-wheel that the studs of the chain will enter the spaces between the successive pairs of rollers and rest upon their peripheries, the chain being thus entirely supported by the rollers.

To prevent the peripheries of the flanges $a^2$ $a^3$ from engaging the studs on the chain, the said flanges are cut away, as shown at $a^8$, at points between the successive rollers.

This construction will cause the chains to run very smoothly and evenly as the driving-wheel is rotated, and because of the freedom of the rollers on the drive-wheel to rotate the chain will immediately free itself from the drive-wheel at the point where it leaves the same, even if the drive-wheel be rotated at a very high speed, thus preventing the drag which is so noticeable on the ordinary forms of sprocket and chain constructions. Furthermore, there is no lost motion to the chain, as the studs are snugly engaged between the successive pairs of rollers.

The driving mechanism, as above described, is particularly applicable for use in the driving of velocipedes and the like; but I do not wish to limit myself to such use, as I contemplate using the mechanism wherever it may be desired.

It is evident that changes might be resorted to in the form and arrangement of the several parts without departing from the spirit and scope of my invention. Hence I do not wish to limit myself strictly to the structure herein set forth; but

What I claim is—

A driving mechanism comprising a chain having studs projecting outwardly from the opposite sides thereof and a driving-wheel having a pair of annular flanges, an annular series of pivots secured to said flanges and a pair of rollers rotatably mounted on each of the said pivots and projecting a considerable distance beyond the peripheries of the flanges, the successive pairs of rollers being adapted to support between them on their peripheries the drive-chain studs at points beyond the peripheries of the flanges, substantially as set forth.

In testimony that I claim the foregoing as my invention I have signed my name, in presence of two witnesses, this 25th day of February, 1898.

SAMUEL F. CLOUSER.

Witnesses:
FREDK. HAYNES,
M. E. FLETCHER.